US010933573B2

(12) United States Patent
Tabata et al.

(10) Patent No.: US 10,933,573 B2
(45) Date of Patent: Mar. 2, 2021

(54) LIQUID BLOW MOLDING APPARATUS AND LIQUID BLOW MOLDING METHOD

(71) Applicant: YOSHINO KOGYOSHO CO., LTD., Tokyo (JP)

(72) Inventors: Shinichi Tabata, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 119 days.

(21) Appl. No.: 16/338,680

(22) PCT Filed: Sep. 4, 2017

(86) PCT No.: PCT/JP2017/031832
§ 371 (c)(1),
(2) Date: Apr. 1, 2019

(87) PCT Pub. No.: WO2018/079080
PCT Pub. Date: May 3, 2018

(65) Prior Publication Data
US 2019/0232544 A1 Aug. 1, 2019

(30) Foreign Application Priority Data
Oct. 31, 2016 (JP) .............................. JP2016-213733

(51) Int. Cl.
*B29C 49/46* (2006.01)
*B29C 49/58* (2006.01)
(Continued)

(52) U.S. Cl.
CPC .............. *B29C 49/06* (2013.01); *B29C 49/12* (2013.01); *B29C 49/46* (2013.01); *B29C 49/58* (2013.01); *B29C 49/66* (2013.01); *B29D 22/003* (2013.01)

(58) Field of Classification Search
CPC ........... B29C 49/46; B29C 2049/4664; B29C 49/58; B29C 2049/5858; B29C 49/6436; B29C 2049/5803
See application file for complete search history.

(56) References Cited

U.S. PATENT DOCUMENTS 2,336,822 A * 12/1943 Wadman ............. B29C 49/6436
65/80
3,125,619 A * 3/1964 Miller ..................... B29C 49/14
264/520
(Continued)

FOREIGN PATENT DOCUMENTS

CN 105283299 A 1/2016
JP S54-86561 A 7/1979
(Continued)

OTHER PUBLICATIONS

May 12, 2020 Extended Search Report issued in European Patent Application No. 17865074.3.
(Continued)

*Primary Examiner* — Robert B Davis
(74) *Attorney, Agent, or Firm* — Oliff PLC

(57) ABSTRACT

A liquid blow molding apparatus comprises: a mold (4) in which a preform (2) is to be placed; and a nozzle unit (6) having a supply port (9) capable of supplying a liquid from above into the preform (2) placed in the mold (4), wherein the nozzle unit (6) includes a seal body (13) that is movable among a closed position at which supply of the liquid through the supply port (9) is blocked, a first open position at which supply of the liquid through only part of the supply port (9) in a circumferential direction is allowed, and a second open position at which supply of the liquid through the whole supply port (9) in the circumferential direction is allowed.

2 Claims, 5 Drawing Sheets

(51) Int. Cl.
 *B29C 49/64* (2006.01)
 *B29C 49/06* (2006.01)
 *B29C 49/12* (2006.01)
 *B29C 49/66* (2006.01)
 *B29D 22/00* (2006.01)

(56) References Cited

U.S. PATENT DOCUMENTS

| | | | |
|---|---|---|---|
| 6,514,451 | B1 | 2/2003 | Boyd et al. |
| 9,987,789 | B2 * | 6/2018 | Kumar ................... B29C 49/12 |
| 2018/0311882 | A1 * | 11/2018 | Nishiyama .......... B29C 49/6427 |

FOREIGN PATENT DOCUMENTS

| | | |
|---|---|---|
| JP | H05-254000 A | 10/1993 |
| JP | 2005-212403 A | 8/2005 |
| JP | 2013-208834 A | 10/2013 |
| JP | 2016-168800 A | 9/2016 |
| JP | 2016-527105 A | 9/2016 |
| WO | 2014/209356 A1 | 12/2014 |
| WO | 2017/090339 A1 | 6/2017 |

OTHER PUBLICATIONS

Apr. 30, 2019 International Preliminary Report on Patentability issued in International Patent Application No. PCT/JP2017/031832.
Oct. 17, 2017 International Search Report issued in International Patent Application No. PCT/JP2017/031832.
Mar. 31, 2020 Office Action issued in Japanese Patent Application No. 2016-213733.
Sep. 14, 2020 Office Action issued in Chinese Patent Application No. 201780061120.4.

* cited by examiner ered cylindrical preform into a container of a predetermined shape, the liquid blow molding apparatus comprising: a mold in which the preform is to be placed; and a nozzle unit having a supply port capable of supplying a liquid from above into the preform placed in the mold, wherein the nozzle unit includes a seal body that is movable among a closed position at which supply of the liquid through the supply port is blocked, a first open position at which supply of the liquid through only part of the supply port in a circumferential direction is allowed, and a second open position at which supply of the liquid through the whole supply port in the circumferential direction is allowed.

LIQUID BLOW MOLDING APPARATUS AND LIQUID BLOW MOLDING METHOD

TECHNICAL FIELD

The present disclosure relates to a liquid blow molding apparatus and a liquid blow molding method.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by placing a bottomed cylindrical preform made of a thermoplastic synthetic resin material such as the above-mentioned materials in a mold and blow molding the bottomed cylindrical preform.

As a blow molding method of molding a preform into a container, liquid blow molding using a pressurized liquid as a pressurized medium supplied into a preform is known.

For example, JP 2013-208834 A (PTL 1) describes a liquid blow molding method whereby a preform preheated to a temperature at which stretchability is developed is set in a mold, a nozzle unit is descended to a position at which the nozzle unit seals the mouth part of the preform, and a liquid is supplied into the preform through the nozzle unit at a predetermined pressure to mold the preform into a container of a predetermined shape along the cavity of the mold. With such a liquid blow molding method, the content liquid to be contained in the container as a product, such as a beverage, can be used as the liquid supplied into the preform to simultaneously mold the container and fill the container with the content liquid, so that the liquid-containing container containing the content liquid can be molded easily. This eliminates the need for a step of filling the molded container with the content liquid, and simplifies the production process and the structure of the production line (apparatus).

Techniques of adjusting the temperature distribution of a preform before being placed in a mold for blow molding to increase the wall thickness of only a specific part of a container yielded as a result of blow molding are also known. For example, PTL 2 describes cooling only a predetermined part of a preform to form the predetermined part as a thick wall part.

CITATION LIST

Patent Literatures

PTL 1: JP 2013-208834 A
PTL 2: JP 2005-212403 A

SUMMARY

Technical Problem

If a vertical strip-shaped thick wall part extending from the mouth part toward the bottom of a container can be formed at one or more locations in the circumferential direction of the container, such a thick wall part can impart buckling resistance to the container, and a thin wall part adjacent to the thick wall part can be used as a decompression absorbing part (a part that absorbs, by deformation to the inner side of the container, negative pressurization of the inside of the container associated with a temperature change). However, forming such a vertical strip-shaped thick wall part requires a complex apparatus structure.

It could therefore be helpful to provide a liquid blow molding apparatus and a liquid blow molding method that can mold a container having a vertical strip-shaped thick wall part without requiring a complex apparatus structure.

Solution to Problem

A liquid blow molding apparatus according to the present disclosure is a liquid blow molding apparatus that molds a bottomed cylindrical preform into a container of a predetermined shape, the liquid blow molding apparatus comprising: a mold in which the preform is to be placed; and a nozzle unit having a supply port capable of supplying a liquid from above into the preform placed in the mold, wherein the nozzle unit includes a seal body that is movable among a closed position at which supply of the liquid through the supply port is blocked, a first open position at which supply of the liquid through only part of the supply port in a circumferential direction is allowed, and a second open position at which supply of the liquid through the whole supply port in the circumferential direction is allowed.

Preferably, in the liquid blow molding apparatus according to the present disclosure, the seal body includes a partial open part that is located on an inner side of the supply port and allows the supply of the liquid through only part of the supply port in the circumferential direction when the seal body is at the first open position, and at least one of an outer circumferential surface of the partial open part and an inner circumferential surface of the supply port has a groove that forms a gap through which the liquid passes when the seal body is at the first open position.

A liquid blow molding method according to the present disclosure is a liquid blow molding method of molding a bottomed cylindrical preform into a container of a predetermined shape using a liquid blow molding apparatus that includes: a mold in which the preform is to be placed; and a nozzle unit having a supply port capable of supplying a liquid from above into the preform placed in the mold, the nozzle unit including a seal body that is movable among a closed position at which supply of the liquid through the supply port is blocked, a first open position at which supply of the liquid through only part of the supply port in a circumferential direction is allowed, and a second open position at which supply of the liquid through the whole supply port in the circumferential direction is allowed, the liquid blow molding method comprising: a preform cooling step of moving the seal body from the closed position to the first open position and causing the liquid to flow down in a vertical strip shape along an inner circumferential surface of the preform, to cool the preform in the vertical strip shape; and a blow molding step of moving the seal body to the second open position and supplying the liquid into the preform to blow mold the preform into the predetermined shape, after the preform cooling step.

Advantageous Effect

It is thus possible to provide a liquid blow molding apparatus and a liquid blow molding method that can mold a container having a vertical strip-shaped thick wall part without requiring a complex apparatus structure.

DETAILED DESCRIPTION

A liquid blow molding apparatus and a liquid blow molding method according to one of the disclosed embodiments will be described in detail below, with reference to drawings. Herein, a direction along the center axis of a bottomed cylindrical preform placed in a mold is referred to as "longitudinal axis direction".

Figure 1:
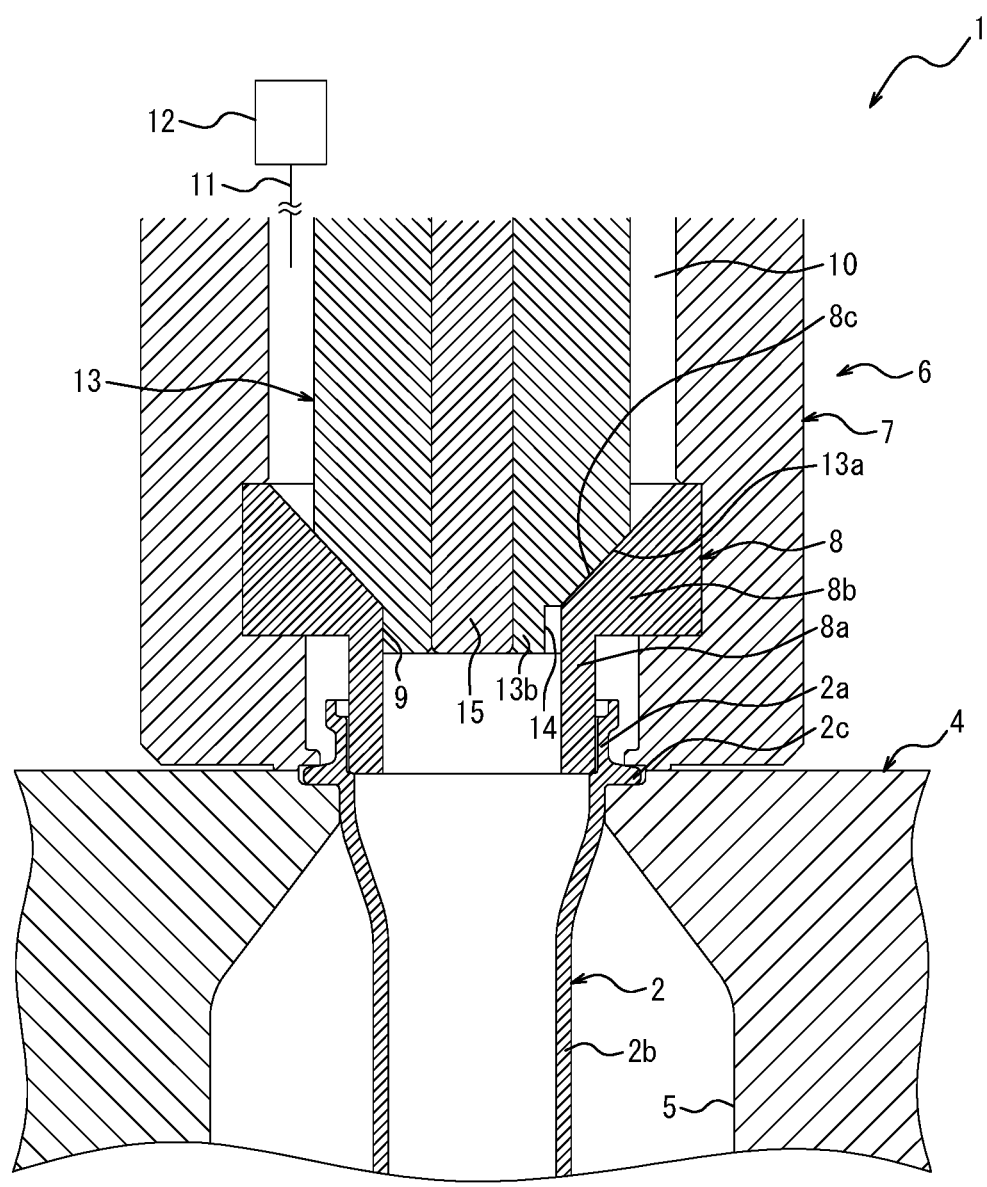
FIG. 1 is a sectional view of a liquid blow molding apparatus according to one of the disclosed embodiments, in a state in which a seal body is at a closed position.

A liquid blow molding apparatus 1 according to this embodiment illustrated in FIG. 1 is used to mold a bottomed cylindrical preform 2 into a container 3 of a predetermined shape (see FIG. 4) by liquid blow molding according to this embodiment, to manufacture the container 3. The term "liquid blow molding" denotes blow molding using a pressurized liquid instead of pressurized air as a pressurized fluid supplied into the preform 2.

The liquid blow molding apparatus 1 includes a mold 4 that is made of, for example, metal and in which the preform 2 is to be placed. Although illustrated only partially in FIG. 1, the mold 4 has a cavity 5 that has a bottle shape and is open upward at the upper surface of the mold 4. The mold 4 is openable right and left, and the molded product can be taken out of the mold 4 by opening the mold 4, although not illustrated in detail.

As the preform 2, a resin material that develops stretchability as a result of heating, such as polypropylene (PP) or polyethylene terephthalate (PET), can be formed into a bottomed cylindrical shape (approximately a test tube shape) including a mouth part 2a and a body part 2b, by means such as injection molding, compression molding, or extrusion molding. A neck ring 2c is formed at the lower end of the outer circumferential surface of the mouth part 2a. Such a preform 2 is preheated to a predetermined temperature at which stretchability is developed and, in this state, placed in the mold 4 in a standing position with the mouth part 2a projecting upward from the cavity 5.

The preform 2 is not limited to a single-layer structure made only of one type of resin material, and may have a laminate structure in which a plurality of types of resin materials are stacked. In this case, the plurality of resin layers may adhere to each other. Alternatively, the preform 2 may have a laminate structure in which an outer layer and an inner layer made of different materials that do not adhere to each other are stacked. In such a laminate structure, an adhesion layer in a vertical strip shape may be provided between the outer layer and the inner layer. In the case where the preform 2 has a laminate structure formed using different materials that do not adhere to each other, the preform 2 can be formed into a delamination container of a predetermined shape by the liquid blow molding apparatus 1. The laminate structure of the preform 2 is not limited to those described above, and may be any layer structure.

A nozzle unit 6 is provided above the mold 4 so as to be movable in the vertical direction relative to the mold 4. The nozzle unit 6 includes a main block 7 and a blow nozzle 8. The blow nozzle 8 has a structure in which a nozzle body 8a having a cylindrical inner circumferential surface whose diameter is smaller than the inner diameter of the mouth part 2a of the preform 2 and a large-diameter sandwiched part 8b are formed integrally using, for example, a steel material or a resin material. The blow nozzle 8 is fixed to the main block 7 as a result of the sandwiched part 8b being fitted onto the inner surface of the main block 7. The part of the nozzle body 8a projecting downward from the sandwiched part 8b is cylindrical.

In this embodiment, the nozzle body 8a is coaxial with the cavity 5 of the mold 4. When the nozzle unit 6 descends to a sealing position illustrated in FIG. 1, the lower end surface of the nozzle body 8a abuts, in the axial direction, on an upward step part formed on the inner surface of the mouth part 2a of the preform 2 placed in the mold 4, to seal the mouth part 2a. Alternatively, the outer diameter of the nozzle body 8a may be set to equal to the inner diameter of the mouth part 2a of the preform 2 to seal the mouth part 2a in the radial direction, or the lower end of the nozzle body 8a may abut on the upper end surface of the mouth part 2a of the preform 2 to seal the mouth part 2a. The part of the nozzle unit 6 other than the nozzle body 8a may engage with, for example, the inner circumferential surface or the upper end surface of the mouth part 2a to seal the mouth part 2a, while the nozzle body 8a does not engage with the mouth part 2a. In such a case, the nozzle body 8a is not limited to be configured to be inserted into the mouth part 2a of the preform 2 when the nozzle unit 6 descends to the sealing position as illustrated in FIG. 1, and may be configured so that, for example, the lower end surface of the nozzle body 8a is located above the mouth part 2a of the preform 2 when the nozzle unit 6 descends to the sealing position.

In this embodiment, a supply port 9 capable of supplying a liquid from above into the preform 2 placed in the mold 4 is formed by the cylindrical inner circumferential surface of the nozzle body 8a. The lower end of the cylindrical supply port 9 is a discharge port for discharging the liquid. The shape of the supply port 9 is, however, not limited to a cylinder.

A supply path 10 coaxial with the nozzle body 8a and extending in the vertical direction is formed inside the main block 7. The lower end of the supply path 10 is connected to the supply port 9. The supply path 10 is also connected to a pressurized liquid supply part 12 through a piping 11. The pressurized liquid supply part 12 can supply the liquid to the supply port 9 through the piping 11 and the supply path 10 at a predetermined pressure or flow rate.

As the pressurized liquid supply part 12, for example, a plunger pump is preferably used as a pressurization source. However, the pressurized liquid supply part 12 may have any other structure as long as it can supply the liquid pressurized to a predetermined pressure into the preform 2.

A seal body 13 for controlling the supply of the liquid through the supply port 9 is provided in the nozzle unit 6. The seal body 13 has a cylindrical bar shape extending along the axis of the supply path 10, and is movable in the vertical direction in the supply path 10. The upper surface of the sandwiched part 8b of the blow nozzle 8 is an inverse conical closed surface 8c. When the seal body 13 moves to the lower stroke end and an inverse conical abutting surface 13a at the tip of the seal body 13 abuts on the closed surface 8c, the communication between the supply path 10 and the supply port 9 is blocked by the seal body 13 to prevent the supply of the liquid into the preform 2 through the supply port 9. Thus, in this embodiment, as a result of the seal body 13 moving to the lower stroke end and the tapered surface 13a abutting on the closed surface 8c, the seal body 13 is at the "closed position" at which the supply of the liquid through the supply port 9 is blocked.

Figure 2:
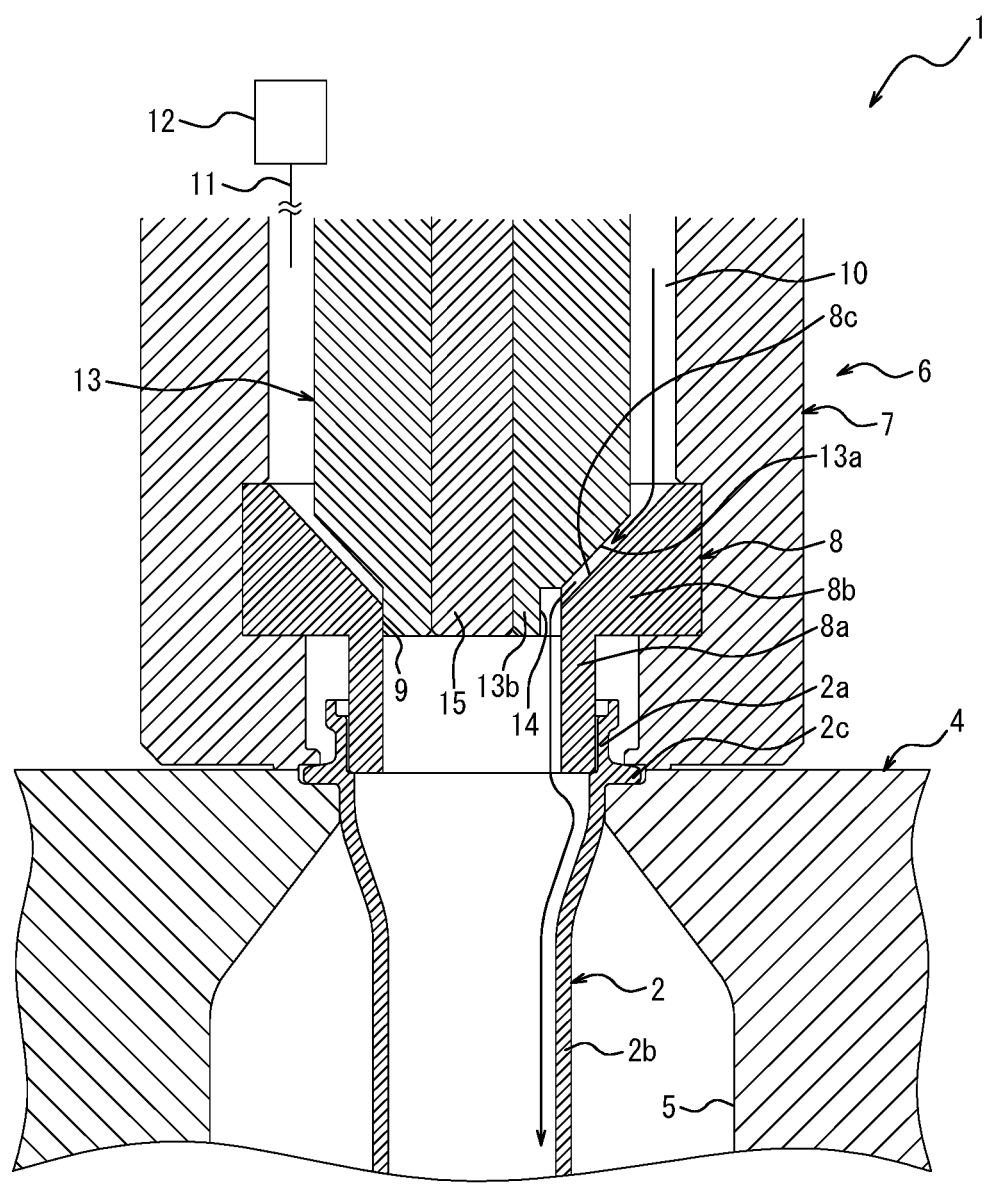
FIG. 2 is a sectional view of the liquid blow molding apparatus illustrated in FIG. 1, in a state in which the seal body is at a first open position.

The seal body 13 includes a cylindrical partial open part 13b that can be in sliding contact with the cylindrical supply port 9, at a position closer to the tip than the abutting surface 13a. In this embodiment, one groove 14 extending in the vertical direction (more specifically, the longitudinal axis direction) is formed on the outer circumferential surface of the partial open part 13b. Accordingly, as the seal body 13 moves upward from the closed position and the abutting surface 13a separates from the closed surface 8c, the outer circumferential surface of the partial open part 13b comes into close contact with the inner circumferential surface of the supply port 9 to allow the supply of the liquid into the preform 2 through only the groove 14, as illustrated in FIG. 2. In this way, the seal body 13 can move to a "first open position" at which the supply of the liquid through only part of the supply port 9 in the circumferential direction is allowed. Herein, "circumferential direction" denotes a direction around the center axis of the bottomed cylindrical preform 2 placed in the mold 4. The groove 14 forms a gap through which the liquid passes, at the first open position. Such a first open position may be set in a plurality of stages or in multiple stages depending on the shape of the thick wall part. For example, although the width and depth of the groove 14 are uniform from the upstream side to the downstream side in this embodiment, the groove 14 may be shaped so that its width and/or depth increases from the upstream side to the downstream side, where the first open position is set in multiple stages at each of which the width and/or depth of the groove 14 changes. In this case, a first open position in a stage that is suitable for the desired shape of the thick wall part can be selected from the first open positions set in multiple stages.

The number of grooves 14 and the location, size, shape, etc. of each groove 14 formed on the outer circumferential surface of the partial open part 13b can be set as appropriate depending on the number of thick wall parts and the location, size, shape, etc. of each thick wall part to be formed in the molded container 3. For example, the groove 14 is not limited to a shape extending in the longitudinal axis direction, and may have a shape extending spirally in the vertical direction. The groove 14 may have a shape whose width is narrower on the downstream side than on the upstream side, or a shape whose width is wider on the downstream side than on the upstream side. The desired number of grooves 14 each with the desired location, size, shape, etc. may be formed on the inner circumferential surface of the supply port 9, instead of the outer circumferential surface of the partial open part 13b. Since the partial open part 13b only suffices to be located on the inner side of the supply port 9 and allow the supply of the liquid through only part of the supply port 9 in the circumferential direction at the first open position, a flow path through the inside of the partial open part 13b may be provided instead of the groove 14. The liquid that has passed through such a groove 14 or flow path flows down along the inner circumferential surface of the nozzle body 8a, and flows down from the mouth part 2a to the bottom of the preform 2 in a vertical strip shape along the inner circumferential surface of the body part 2b of the preform 2, thus cooling the preform 2 in a vertical strip shape.

Figure 3:
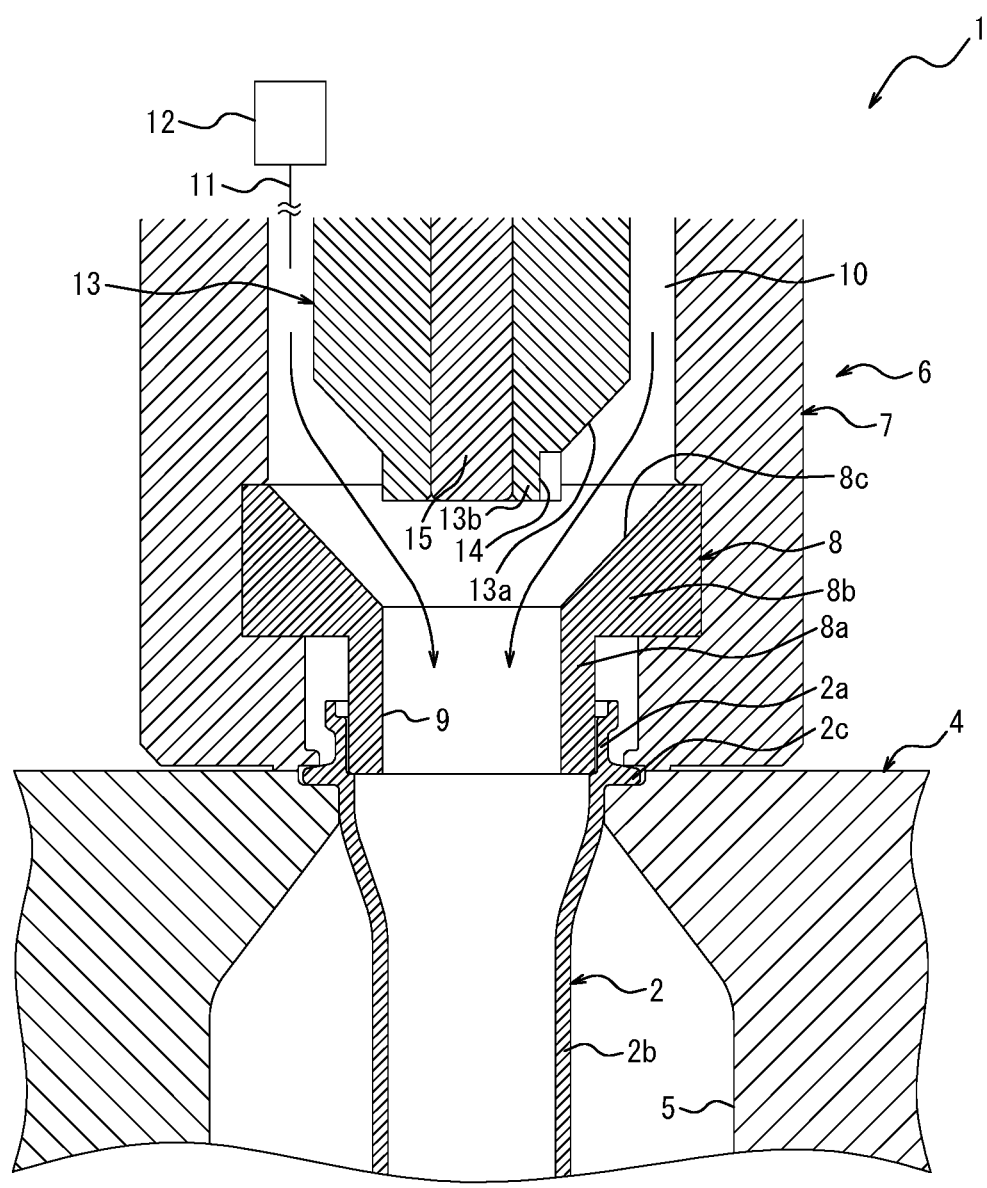
FIG. 3 is a sectional view of the liquid blow molding apparatus illustrated in FIG. 1, in a state in which the seal body is at a second open position.

Further, as a result of the seal body 13 moving upward from the first open position and the partial open part 13b separating from the supply port 9, the supply of the liquid through the whole supply port 9 in the circumferential direction is allowed, as illustrated in FIG. 3. In this way, the seal body 13 can move to a "second open position" at which the supply of the liquid through the whole supply port 9 in the circumferential direction is allowed.

In this embodiment, a stretching rod 15 is slidably placed on the inner side of the seal body 13. The stretching rod 15 is movable in the vertical direction (more specifically, the longitudinal axis direction) relative to the seal body 13. By moving the stretching rod 15 downward relative to the seal body 13, the body part 2b of the preform 2 placed in the mold 4 can be stretched in the longitudinal axis direction in the cavity 5. Hence, the liquid blow molding apparatus 1 can perform biaxial stretching blow molding on the preform 2 by stretching the preform 2 in the longitudinal axis direction using the stretching rod 15 before or while supplying the pressurized liquid into the preform 2. The stretching rod 15 may be omitted from the liquid blow molding apparatus 1.

A method (liquid blow molding method according to this embodiment) of molding the preform 2 into the container 3 of the predetermined shape using the liquid blow molding apparatus 1 having such a structure will be described below.

First, the preform 2 preheated to such a predetermined temperature (e.g. 80° C. to 150° C.) at which stretchability is developed using a heating means such as a heater (not illustrated) is placed in the mold 4, and the mold is clamped. The nozzle unit 6 is descended to the sealing position, to be in the state illustrated in FIG. 1.

A preform cooling step is then performed. In the preform cooling step, the seal body 13 is moved from the closed position to the first open position and the liquid is caused to flow down in a vertical strip shape along the inner circumferential surface of the preform 2 to cool the preform 2 in a vertical strip shape, as illustrated in FIG. 2. Here, the pressurized liquid supply part 12 may or may not pressurize the liquid. In the case where the pressurized liquid supply part 12 pressurizes the liquid, the pressurization by the pressurized liquid supply part 12 is preferably controlled to a pressure or a flow rate so that the preform 2 will not deform due to the pressure from the liquid flowing into the preform 2.

After the preform cooling step ends, a blow molding step is performed. In the blow molding step, the pressurized liquid supply part 12 is operated and the seal body 13 is moved to the second open position to supply the liquid into the preform 2 and blow mold the preform 2 into the predetermined shape along the cavity 5 of the mold 4, as illustrated in FIG. 3. Here, the part of the preform 2 cooled in a vertical strip shape stretches less than the other part (i.e. has lower fluidity when stretching), and accordingly is molded thicker. That is, the part of the preform 2 cooled in a vertical strip shape becomes a vertical strip-shaped thick wall part 16 of the liquid blow molded container 3 (see FIG. 4). Thus, according to this embodiment, by forming the vertical strip-shaped thick wall part 16 in the desired circumferential position of the container 3 to be molded, the desired buckling resistance and decompression absorbing function can be imparted to the container 3. Moreover, since the thick wall part 16 can be formed by the liquid used in the liquid blow molding, a complex apparatus is not required.

Furthermore, according to this embodiment, the thick wall part 16 can be formed by a simple structure of providing the partial open part 13b in the seal body 13.

In the blow molding step, biaxial stretching blow molding whereby the preform 2 is blow molded by the liquid after or while stretching the preform 2 in the longitudinal axis direction using the stretching rod 15 can be performed. Although the preform cooling step is performed before the stretching using the stretching rod 15 in the foregoing example, the preform cooling step may be performed during or after the stretching using the stretching rod 15. The stretching using the stretching rod 15 may not be performed in any of the preform cooling step and blow molding step.

Figure 4:
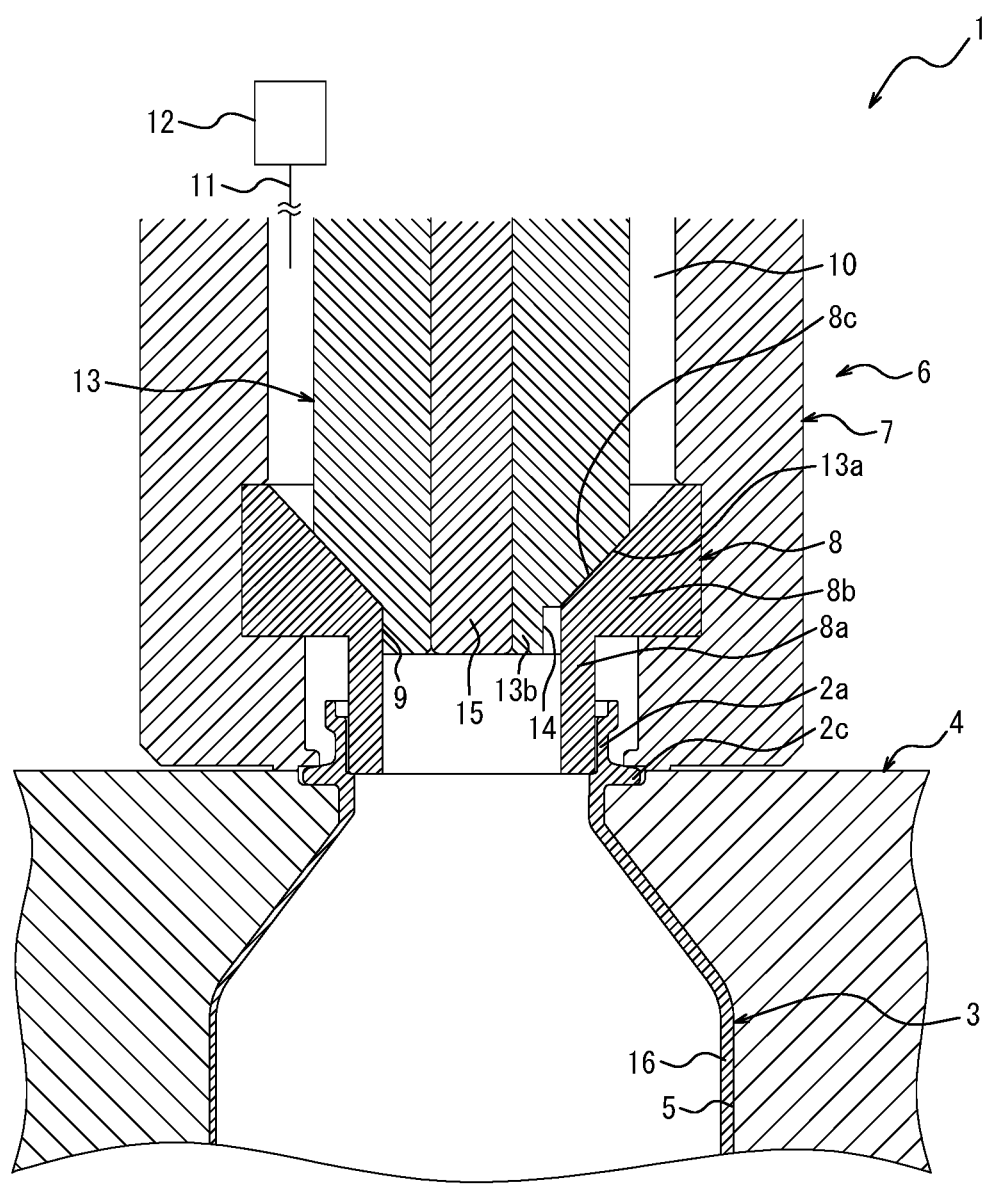
FIG. 4 is a sectional view of the liquid blow molding apparatus illustrated in FIG. 1, in a state in which molding of a container is completed.

After the blow molding step ends, the preform 2 has been molded into the container 3 of the predetermined shape containing the liquid, as illustrated in FIG. 4. Although not illustrated in detail, after the blow molding step, the nozzle unit 6 is moved upward, and a cap is attached to the mouth part 2a disengaged from the blow nozzle 8. The mold 4 is then opened to take the finished liquid-containing container 3 out of the mold 4. The cap may be attached to the mouth part 2a of the liquid-containing container 3 after taking the liquid-containing container 3 out of the mold 4.

Figure 5:
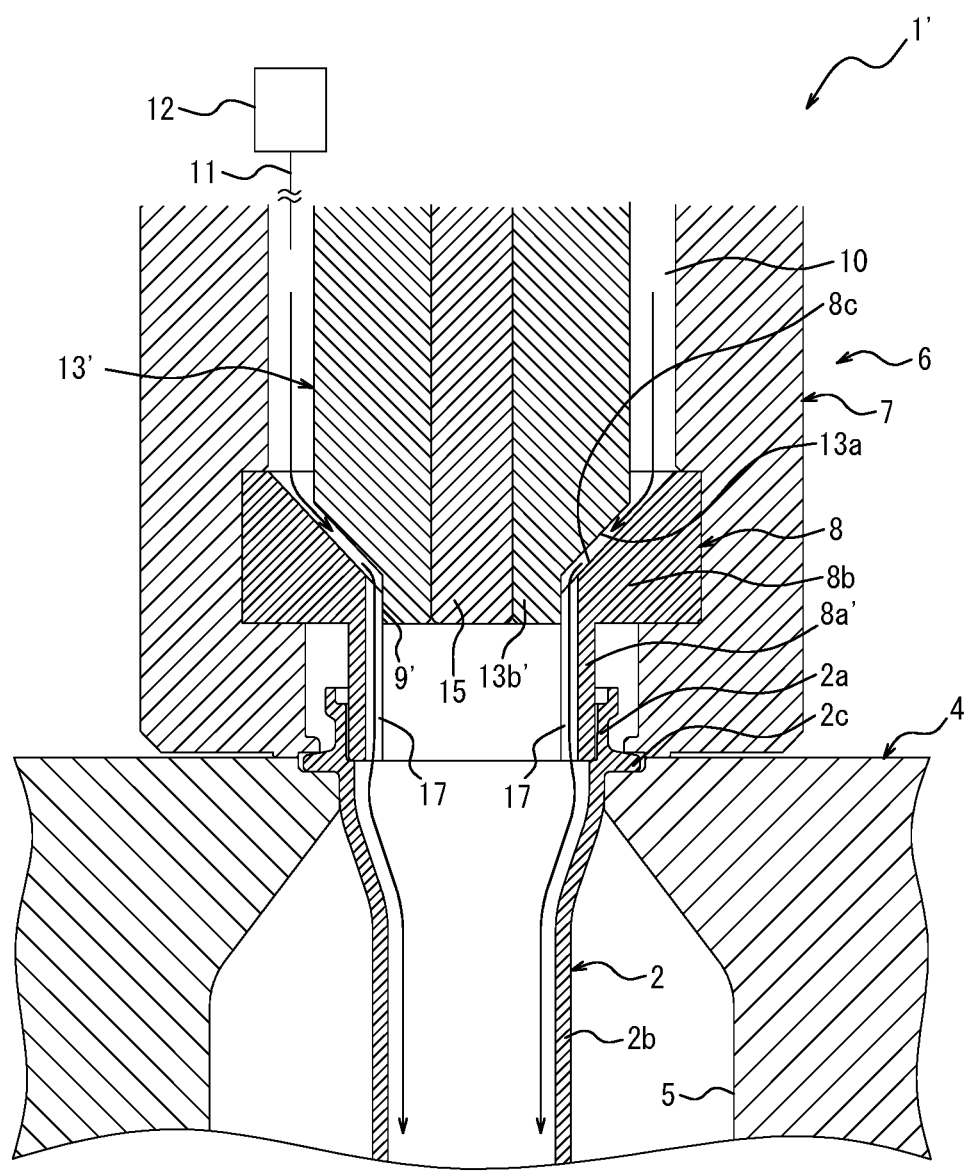
FIG. 5 is a sectional view of a liquid blow molding apparatus according to another one of the disclosed embodiments, in a state in which a seal body is at a first open position.

In the embodiment illustrated in FIGS. 1 to 4, the groove 14 is formed on the outer circumferential surface of the partial open part 13b. Alternatively, at least one groove 17 may be formed on the inner circumferential surface of the supply port 9, as illustrated in FIG. 5. FIG. 5 is a sectional view of a liquid blow molding apparatus 1' according to another one of the disclosed embodiments, in a state in which a seal body 13' is at the first open position. In this embodiment, instead of forming the groove 14 (see FIG. 2) in a partial open part 13b' of the seal body 13', a pair of grooves 17 extending in the longitudinal axis direction and facing each other are formed on the inner circumferential surface of the supply port 9' (the inner circumferential surface of the nozzle body 8a'). The other structures are the same as those in the foregoing embodiment. At the first open position illustrated in FIG. 5, the liquid flowing down through the pair of grooves 17 flows down in a vertical strip shape along the inner circumferential surface of the body part 2b of the preform 2, thus cooling the preform 2 in a vertical strip shape. The number of grooves 17 and the location, size, shape, etc. of each groove 17 can be set as appropriate depending on the number of thick wall parts and the location, size, shape, etc. of each thick wall part to be formed in the molded container 3 (see FIG. 4), as in the foregoing embodiment. A flow path through the inside of the nozzle body may be provided instead of the groove 17. For example, a pair of flow paths extending in the longitudinal axis direction inside the nozzle body and facing each other may be provided instead of the pair of grooves 17. In this case, when the seal body moves to the first open position, the liquid is supplied into the preform through only part of the supply port in the circumferential direction formed by the inner circumferential surface of the nozzle body and the inner circumferential surface of each of the pair of flow paths. Herein, "circumferential direction" denotes a direction around the center axis of the bottomed cylindrical preform placed in the mold, as mentioned above.

While embodiments of the present disclosure have been described above, the foregoing embodiments are merely exemplary embodiments of the present disclosure, and various changes can be made without departing from the scope of the present disclosure.

REFERENCE SIGNS LIST 1, 1' liquid blow molding apparatus
2 preform
2a mouth part
2b body part
2c neck ring
3 container
4 mold
5 cavity
6 nozzle unit
7 main block
8 blow nozzle
8a, 8a' nozzle body
8b sandwiched part
8c closed surface
9, 9' supply port
10 supply path
11 piping
12 pressurized liquid supply part
13, 13' seal body
13a abutting surface
13b, 13b' partial open part
14 groove
15 stretching rod
16 thick wall part
17 groove

The invention claimed is:

1. A liquid blow molding apparatus that molds a bottomed cylindrical preform into a container of a predetermined shape, the liquid blow molding apparatus comprising:
   a mold in which the preform is to be placed; and
   a nozzle unit having a supply port capable of supplying a liquid from above into the preform placed in the mold,
   wherein the nozzle unit includes a seal body that is movable among a closed position at which supply of the liquid through the supply port is blocked, a first open position at which supply of the liquid through only part of the supply port in a circumferential direction is allowed, and a second open position at which supply of the liquid through the whole supply port in the circumferential direction is allowed,
   wherein the seal body includes a partial open part that is located on an inner side of the supply port and allows the supply of the liquid through only part of the supply port in the circumferential direction when the seal body is at the first open position, and
   at least one of an outer circumferential surface of the partial open part and an inner circumferential surface of the supply port has a groove that forms a gap through which the liquid passes when the seal body is at the first open position.

2. A liquid blow molding method of molding a bottomed cylindrical preform into a container of a predetermined shape using a liquid blow molding apparatus that includes: a mold in which the preform is to be placed; and a nozzle unit having a supply port capable of supplying a liquid from above into the preform placed in the mold, the nozzle unit including a seal body that is movable among a closed position at which supply of the liquid through the supply port is blocked, a first open position at which supply of the liquid through only part of the supply port in a circumferential direction is allowed, and a second open position at which supply of the liquid through the whole supply port in the circumferential direction is allowed, the liquid blow molding method comprising:

a preform cooling step of moving the seal body from the closed position to the first open position and causing the liquid to flow down in a vertical strip shape along an inner circumferential surface of the preform, to cool the preform in the vertical strip shape; and a blow molding step of moving the seal body to the second open position and supplying the liquid into the preform to blow mold the preform into the predetermined shape, after the preform cooling step.

\* \* \* \* \*